3,464,986
THIO-CARBAMYL-γ-LACTONES
Ranajit Ghosh and Nigel Douglas Bishop, Bracknell, England, assignors to Imperial Chemical Industries Limited, London, England, a corporation of Great Britain
No Drawing. Filed Feb. 10, 1966, Ser. No. 526,380
Claims priority, application Great Britain, Feb. 18, 1965, 7,076/65
Int. Cl. C07d 87/46, 5/06; A01n 9/20
U.S. Cl. 260—247.1                                   7 Claims

ABSTRACT OF THE DISCLOSURE

Lactone-carbamyl compounds having the formula:

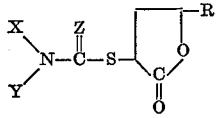

wherein R stands for hydrogen or lower alkyl, Z stands for oxygen or sulphur, X and Y each stand for hydrogen, or alkyl or together represent a heterocyclic group including the adjacent N atom or X stands for hydrogen and Y stands for alkylene, halo-substituted aryl, aralkyl, aryl, heterocyclic, heterocyclic-alkyl, dialkylamino, alkoxy-carbonyl alkyl or lactone-carbamyl-alkyl. These compounds possess fungicidal activity and are useful for the control of blast on rice (*Piricutaria oryzae*), rust on wheat (*Puccinia triticina*) and sore skin on cotton (*Rhizoctonia solani*).

---

This invention relates to new carbamyl compounds and to improved biologically active compositions containing the same.

According to the present invention there are provided new lactone-carbamyl compounds having the formula:

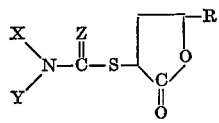

wherein R stands for hydrogen or for a lower alkyl group and Z stands for oxygen or sulphur and wherein X and Y, which may be the same or different, each stand for a hydrogen atom or for an alkyl group or together represent a heterocyclic group including the adjacent N atom or wherein X stands for a hydrogen atom and Y stands for an allyl, aryl, halo-substituted aryl, aralkyl, heterocyclic, heterocyclic-alkyl, dialkylamino, alkoxy-carbonyl alkyl or lactone-carbamyl-alkyl group.

The group

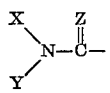

is referred to herein as a carbamyl acid residue. The lactone ring is derived from tetrahydrofuran and contains 5 ring atoms. The lactone ring may bear a substituent additional to the carbamyl acid residue for example an alkyl group. The carbamyl acid residue which is required to be present is attached through a connecting atom of sulphur to the α-carbon atom of the lactone ring, that is to the carbon atom occupying the position adjacent to the carbonyl group of the lactone ring.

The nitrogen atom of the carbamyl acid residue may carry substituents X and Y each of which may be an alkyl group especially one having from 1 to 6 carbon atoms. When X stands for hydrogen the Y substituent may be an allyl; a dialkyl-amino group, or a substituted alkyl group, wherein the substituent may be an alkoxy carbonyl group, a phenyl group, a heterocyclic group or a lactone-carbamyl group. The Y substituent may alternatively be a phenyl group or a substituted phenyl group for example a halophenyl group, such as chloro-phenyl group. A heterocyclic group, for example, a morpholino group, may also be attached to the nitrogen atom of the carbamyl acid residue, or the latter may form part of a heterocyclic ring which can contain one or more hetero atoms. Thus compounds are included wherein the nitrogen atom forms part of a morpholine or piperidine ring.

Preferred compounds include those wherein R of the formula quoted above stands for hydrogen or a methyl group, and Z stands for sulphur. When Z stands for oxygen it is preferred that R stands for a methyl group. X and Y which may be the same or different, are preferably H—, CH$_3$—, C$_2$H$_5$—, iC$_3$H$_7$—, nC$_4$H$_9$—, nC$_6$H$_{13}$—, or nC$_{12}$H$_{23}$—. When X is H then Y may be for example CH$_2$=CH—CH$_2$—, C$_2$H$_5$·O·CO·CH$_2$—,

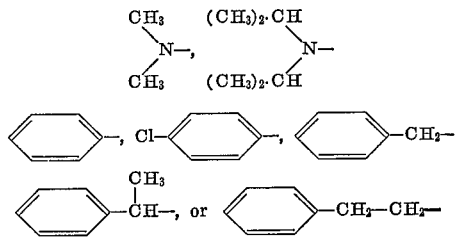

The compounds of the invention may be obtained by a number of different processes. For example a salt of a carbamic acid may be brought into reaction with a lactone having a replaceable halogen atom attached to a carbon atom of the lactone ring. Salts which may be employed are alkali, alkaline earth and ammonium salts although salts of tertiary amines may also be used. For most purposes the sodium salts of the acids are generally employed. The halo-lactones which may be employed may be either bromo- or chloro-lactones. The halo-lactone is conveniently bromo-substituted, for example 2-oxo-3-bromo-tetrahydrofuran.

Carbamic acids and their salts vary greatly in their stability and monothio- and dithiocarbamic acids and their salts are especially unstable. Therefore in order to make mono- and di-thiocarbamyl compounds a salt of the respective acid is prepared preferably immediately before use by bringing into reaction ammonia or a primary or secondary amine with either carbonyl sulphide or carbon disulphide in the presence of a base. The amine used in the reaction should have attached to the nitrogen atom an aliphatic, aromatic or heterocyclic group. Alternatively the nitrogen atom should form part of a heterocyclic ring. If desired the salt may be separated from the reaction mixture before treatment with a halo-lactone, however compounds are also obtained very conveniently by treating the reaction mixture of the carbonyl sulphide or the carbon disulphide, with the amine and the base, with the halo-lactone. Both the formation of a carbamate salt and its subsequent reaction with the halo-lactone takes place readily at ambient or elevated temperatures i.e. below about 100° C. and preferably below 50° C. In general both reactions are carried out preferably at a temperature of from 20–40° C. The reactions may be carried out in the presence either of water or an organic liquid although for most purposes water provides a very satisfactory medium and may be added in the form of an aqueous solution of the base used to form the carbamate salt or as a solution of the salt which is required to undergo reaction with the halo-lactone.

Other processes may be used for making the compounds including for example the bringing into reaction in the presence of a base of a carbamyl halide, a thiocarbamyl halide, an isocyanate or an isothiocyanate with a hydroxy- or mercapto-derivative of a lactone. The processes are carried out preferably in the presence of a nonhydroxylic solvent, for example diethyl ether, benzene or petroleum ether at temperatures of 0°–100° C. and preferably at 20–40° C.

The compounds may be used both in agriculture and horticulture. The compounds display fungicidial activity and are especially useful for the control of blast on rice (*Piricularia oryzae*), rust on wheat (*Puccinia triticiana*) and sore skin on cotton (*Rhizoctonia solani*). The compounds are also useful as intermediates in the preparation of other biologically active compounds.

The compounds are preferably converted into formulations to assist in their application. For example they may be used in the form of a powdery composition in which a minor amount of the compound is present in admixture with a major amount of a solid diluent.

Suitable diluents include powdered kaolin, Fuller's earth, gypsum, chalk, Hewitt's earth and china clay. Since a certain number of the compounds are liquid at ordinary temperatures they are usually applied more conveniently in the form of a liquid preparation which is generally an aqueous dispersion or emulsion containing a surface active agent, for example a wetting or dispersing agent. Suitable surface active agents include condensation products of ethylene oxide with various substances, for example with alkylated phenols including octyl phenol and nonyl phenol; sorbitan monolaurate; oleyl alcohol; cetyl alcohol; and propylene oxide polymer. Other agents which are also suitable include calcium dodecyl benzenesulphonate, calcium butyl naphthalenesulphonate, calcium lignosulphonate, sodium lignosulphonate, ammonium lignosulphonate and glue. An alternative method for making liquid preparations comprises dissolving the compounds in an organic solvent for example benzene, methanol, ethanol, or acetone, and then agitating the solution with water containing a surface active agent.

The compounds are conveniently made available by a supplier in the form of a concentrate which is a composition containing a high proportion of the compound and which therefore is generally required to be diluted, usually with water, before application. The concentrates may contain from 10 to 85% by weight of the compound although for practical purposes from 25–65% by weight is usually preferred. An especially satisfactory form of concentrate comprises a concentrated solution of the compound in an organic solvent containing a surface active agent which is also soluble in the solvent. The diluted preparations which are suitable for application and which usually take the form of aqueous dispersions may contain amounts of compound which can vary widely. However good results are generally obtainable by using from 0.025 to 0.2% by weight of the compound. The compounds, preferably in a formulated condition, may be applied by conventional methods. Thus compounds which are to be used for their capacity to control diseases caused by fungi to the foliage of plants are applied more conveniently in the form of liquid preparations either to the plants or the soil in which plants are to be grown or are growing. Solid compositions are however preferably for the treatment of seeds to provide protection to the seeds from soil or seed borne diseases.

This invention is illustrated by the following examples:

Example 1

This example illustrates the preparation of 2-oxo-3(N-methyl-thiocarbamylthio)tetrahydrofuran having the formula:

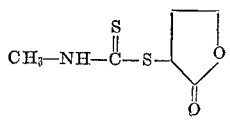

A solution of sodium hydroxide (8.0 g.) in water (15 cc.) was added dropwise to a stirred mixture of methylamine (17.1 cc. of a 40% aqueous solution) and carbon disulphide (12.6 cc.). The temperature of the mixture during the addition was warmed to 40° C., and stirring was continued until all the carbon disulphide had reacted. The temperature of the mixture was then reduced to 5° C. and 2-oxo-3-bromo tetrahydrofuran (33.0 g.) was added dropwise, with vigorous stirring. After the addition had been completed the mixture was stirred for a further period (0.5 hr.) and the product was then extracted with ether which was then removed by distillation.

As a result of the removal of the ether 2-oxo-3(N-methylthiocarbamylthio)tetrahydrofuran was obtained as an oil which crystallised on standing. The product was then purified by recrystallisation from aqueous ethanol and was then found to possess a melting point of 60–61° C.

Example 2

This example illustrates the preparation of 2-oxo-3(N-allyl-thiocarbamylthio)tetrahydrofuran having the formula:

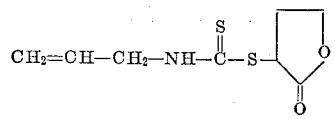

Carbon disulphide (6.3 cc.), was added dropwise with stirring to a mixture of allylamine (7.5 cc.) and a solution of sodium hydroxide (4.0 g.) in water (10 cc.). The temperature of the mixture was kept below 30° C. until the reaction was completed. The mixture was then diluted with water (15 cc.) and 2-oxo-3-bromo-tetrahydrofuran (16.5 g.) added slowly with vigorous stirring. An oil was obtained which was extracted with ether. The extract was then distilled to remove the ether and 2-oxo-3(N-allyl-thiocarbamylthio)tetrahydrofuran was obtained as a liquid having a boiling point of 140° C. at a pressure of 0.1 mm. of mercury.

Example 3

This example illustrates the preparation of 2-oxo-3(N-p-chlorophenylthiocarbamylthio)tetrahydrofuran having the formula:

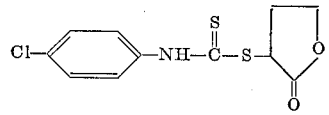

A solution of p-chloro-aniline (12.8 g.) in ethanol (32 cc.) was added slowly to a mixture of carbon disulphide (7 cc.) and an aqueous solution of ammonia (Specific Gravity=0.880; 16 cc.) at 5° C. The mixture was stirred for 4 hours at 15–20° C. and then cooled at 0° C. A yellow precipitate of ammonium N-p-chlorophenyldithiocarbamate was formed and was then removed by filtration and the resulting solid was then washed with alcohol (10 cc.). Ammonium N-p-chlorophenyldithiocarbamate (16.2 g) formed in the above process was dissolved in water (20 cc.) and the solution cooled to 5° C. 2-oxo-3-bromo-tetrahydrofuran (12.1 g.) was then added slowly with vigorous stirring, and at the same time the temperature of the reaction mixture was maintained below 10° C. by external cooling. 2-oxo-3(N-p-chlorophenylthiocarbamylthio)tetrahydrofuran was obtained as a white solid which on recrystallisation from ethanol was found to have a melting point of 105–106° C.

Example 4

This example illustrates the preparation of 2-oxo-3(N-dimethylaminothiocarbamylthio)tetrahydrofuran having the formula:

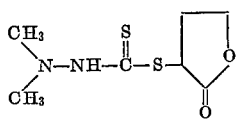

The procedure of Example 2 was followed except that 1,1-dimethylhydrazine (6 g.) was used in place of allylamine. 2-oxo-3(N-dimethylaminothiocarbamylthio) tetrahydrofuran was obtained as a solid which on recrystallisation from ethanol was found to possess a melting point of 136° C.

Example 5

This example illustrates the preparation of 2-oxo-3-(N-di-isopropylaminothiocarbamylthio)tetrahydrofuran having the formula:

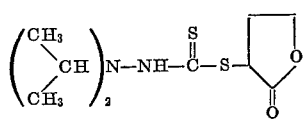

The procedure of Example 4 was followed except that 1,1-di-isopropylhydrazine (11.6 g.) was used in place of 1,1 - dimethylhydrazine. 2-oxo-3(N-di-isopropylaminocarbamylthio)tetrahydrofuran, was obtained as a yellow solid which after recrystallisation from ethanol was found to possess a melting point of 123° C.

Example 6

This example illustrates the preparation of 2-oxo-3 (N,N-dimethylthiocarbamylthio) tetrahydrofuran having the formula:

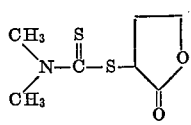

The procedure of Example 2 was followed except that a 30% aqueous solution of dimethylamine (18 cc.) was used in the place of allylamine. 2-oxo-3 (N,N-dimethylthiocarbamylthio) tetrahydrofuran was obtained as a solid which on recrystallisation from ethanol was found to possess a melting point of 120° C.

Example 7

This example illustrates the preparation of 2-oxo-3 (N-methylthiocarbamylthio) - 5 - methyltetrahydrofuran having the formula:

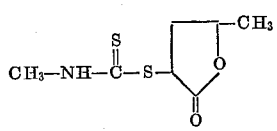

Carbon disulphide (6.3 cc.) was added dropwise to a 40% aqueous solution of methylamine (16 cc.). The exothermic reaction yielded methylammonium N-methyldithiocarbamate which was obtained as a dry salt by removal under reduced pressure of the water and excess reactants. The dry salt (10 g.) was dissolved in water (20 cc.) and 2-oxo-3-bromo - 5 - methyltetrahydrofuran (13 g.) was added dropwise with vigorous stirring. After stirring for a further period (2 hrs.) the product was extracted with ether and the extract distilled to remove the solvent. 2-oxo-3 (N-methylthiocarbamylthio)-5-methyltetrahydrofuran was obtained as an oil boiling at 132–135° C. at a pressure of 0.2 mm. of mercury.

Example 8

This example illustrates the preparation of 2-oxo-3 (N-ethylthiocarbamylthio) - 5 - methyltetrahydrofuran having the formula:

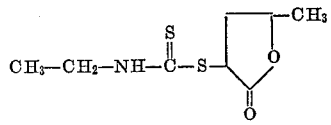

Carbon disulphide (6.3 cc.) was added carefully to a mixture of ethylamine (6.5 cc. of 70% aqueous solution) and ethylamine (10.1 cc.). The temperature of the mixture was maintained below 30° C. during the addition. Stirring was continued until a homogeneous solution was obtained which solidified on standing. The solid was then dissolved in water (15 cc.) and 2-oxo-3-bromo-5-methyltetrahydrofuran was added dropwise. During the addition the temperature of the reaction mixture was maintained below 10° C. The addition was followed by a further period of stirring (0.5 hr.), after which the product was extracted with ether and the extract distilled to remove the solvent. 2-oxo-3 (N-ethylthiocarbamylthio)-5-methyltetrahydrofuran was obtained as a yellow oil, boiling at a temperature of 123–131° C. at a pressure of 0.03 mm. of mercury.

Example 9

This example illustrates the preparation of 2-oxo-3 (N-isopropylthiocarbamylthio) - 5 - methyltetrahydrofuran having the formula:

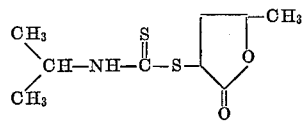

The procedure of Example 8 was followed except that isopropylamine (8.5 cc.) was used in the place of ethylamine. 2-oxo-3 (N-isopropylthiocarbamylthio)-5-methyltetrahydrofuran was obtained as a yellow oil boiling at a temperature of 143° C. at a pressure of 0.04 mm. of mercury.

Example 10

This example illustrates the preparation of 2-oxo-3 (N-n-butylthiocarbamylthio) - 5 - methyltetrahydrofuran having the formula:

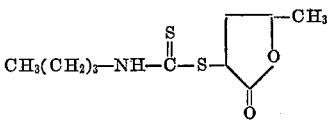

The procedure of Example 8 was followed except that n-butylamine (10.5 cc.) was used in the place of ethylamine. 2-oxo-3 (N-n-butylthiocarbamylthio) - 5 - methyltetrahydrofuran was obtained as a yellow oil boiling at a temperature of 136–141° C. at a pressure of 0.1 mm. of mercury.

Example 11

The example illustrates the preparation of 2-oxo-3 (N - n - hexylthiocarbamylthio) - 5 - methyltetrahydrofuran having the formula:

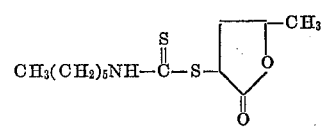

The procedure of Example 8 was followed except that n-hexylamine (10.1 g.) was used in the place of ethylamine. 2-oxo-3 (N-n-hexylthiocarbamylthio) - 5 - methyltetrahydrofuran was obtained as a yellow oil at a temperature of 153–155° C. at a pressure of 0.05 mm. of mercury.

Example 12

This example illustrates the preparation of 2-oxo-3 (N-n - dodecylthiocarbamylthio) - 5-methyltetrahydrofuran having the formula:

$$CH_3(CH_2)_{11}-NH-\overset{\overset{S}{\|}}{C}-S-\underset{\underset{O}{\|}}{\overbrace{\phantom{XX}}^{-CH_3}}$$

The procedure of Example 8 was used except that n-dodecylamine (18.5 g.) was used in the place of ethylamine. 2-oxo-3 (N-n-dodecylthiocarbamylthio)-5-methyltetrahydrofuran was obtained initially as an oil boiling at a temperature of 160–170° C. at a pressure of 0.09 mm. of mercury. The oil solidified on standing and the solid after recrystallisation from aqueous ehanol was found to melt at 72° C.

Example 13

This example illustrates the preparation of 2-oxo-3 (N-allylthiocarbamylthio) - 5-methyltetrahydrofuran having the formula:

$$CH_2=CH-CH_2-NH-\overset{\overset{S}{\|}}{C}-S-\underset{\underset{O}{\|}}{\overbrace{\phantom{XX}}^{-CH_3}}$$

The procedure of Example 2 was followed except that 2-oxo-3-bromo-5-methyltetrahydrofuran (17.9 g.) was used in the place of 2-oxo-3-bromo-tetrahydrofuran. 2-oxo-3 (N-allylthiocarbamylthio)-5-methyltetrahydrofuran was obtained as an oil boiling at a temperature of 142–144° C. at a pressure of 0.07 mm. of mercury.

Example 14

This example illustrates the preparation of 2-oxo-3 (N-phenylthiocarbamylthio) - 5-methyltetrahydrofuran having the formula:

$$\text{Ph}-NH-\overset{\overset{S}{\|}}{C}-S-\underset{\underset{O}{\|}}{\overbrace{\phantom{XX}}^{-CH_3}}$$

The procedure of Example 8 was followed except that aniline (9.3 cc.) was used in the place of ethylamine. 2-oxo-3(N-phenylthiocarbamylthio) - 5-methyltetrahydrofuran was obtained as a solid which on recrystallisation from ethanol was found to melt at 119° C.

Example 15

This example illustrates the preparation of 2-oxo-3 (N-p - chlorophenylthiocarbamylthio) - 5-methyltetrahydrofuran having the formula:

$$Cl-\text{Ph}-NH-\overset{\overset{S}{\|}}{C}-S-\underset{\underset{O}{\|}}{\overbrace{\phantom{XX}}^{-CH_3}}$$

The procedure of Example 3 was followed except that 2 - oxo-3-bromo-5-methyltetrahydrofuran (12.8 g.) was used in place of 2-oxo-3-bromo-tetrahydrofuran. 2-oxo-3 (N - p-chlorophenylthiocarbamylthio) - 5-methyltetrahydrofuran was obtained as a solid which after purification by recrystallisation from a mixture of chloroform and 40–60 petroleum ether was found to melt at a temperature of 110–112° C.

Example 16

This example illustrates the preparation of 2-oxo-3 (N-dimethylaminothiocarbamylthio) - 5 - methyltetrahydrofuran having the formula:

$$\underset{CH_3}{\overset{CH_3}{\diagdown}}N-NH-\overset{\overset{S}{\|}}{C}-S-\underset{\underset{O}{\|}}{\overbrace{\phantom{XX}}^{-CH_3}}$$

The procedure of Example 4 was followed except that 2 - oxo-3-bromo-5-methyltetrahydrofuran (17.8 g.) was used in the place of 2-oxo-3-bromo-tetrahydrofuran. 2-oxo-3(N - dimethylaminothiocarbamylthio) - 5-methyltetrahydrofuran was obtained as a solid which on recrystallisation from ethanol was found to posses a melting point of 125–127° C.

Example 17

This example illustrates the preparation of 2-oxo-3(N-benzylthiocarbamylthio) - 5 - methyltetrahydrofuran having the formula:

$$\text{Ph}-CH_2-NH-\overset{\overset{S}{\|}}{C}-S-\underset{\underset{O}{\|}}{\overbrace{\phantom{XX}}^{-CH_3}}$$

The procedure of Example 8 was followed except that benzylamine (10.7 g.) was used in the place of ethylamine. 2-oxo-3 (N-benzylthiocarbamylthio) - 5 - methyltetrahydrofuran was formed as a solid which on recrystallisation was found to possess a melting point of 89° C.

Example 18

This example illustrates the preparation of 2-oxo-3 (N-1-phenethylthiocarbamylthio) - 5 - methyltetrahydrofuran having the formula:

$$\text{Ph}-\underset{CH_3}{\overset{|}{CH}}-NH-\overset{\overset{S}{\|}}{C}-S-\underset{\underset{O}{\|}}{\overbrace{\phantom{XX}}^{-CH_3}}$$

The procedure of Example 8 was followed except that 1-phenethylamine (12.1 g.) was used in the place of ethylamine. 2-oxo-3 (N-1-phenethylthiocarbamylthio)-5-methyltetrahydrofuran was obtained as a solid which after recrystallisation from ethanol was found to possess a melting point of 98° C.

Example 19

This example illustrates the preparation of 2-oxo-3 (N-2 - phenethylthiocarbamylthio)-5-methyltetrahydrofuran having the formula:

$$\text{Ph}-CH_2-CH_2-NH-\overset{\overset{S}{\|}}{C}-S-\underset{\underset{O}{\|}}{\overbrace{\phantom{XX}}^{-CH_3}}$$

The procedure of Example 8 was followed except that 2-phenethylamine (12.1 g.) was used in the place of ethylamine. 2-oxo-3 (N-2-phenethylthiocarbamylthio)-5-methyltetrahydrofuran was obtained as a solid which after recrystallisation from ethanol was found to possess a melting point of 102° C.

Example 20

This example illustrates the preparation of 2-oxo-3 (N - tetrahydropyran - 2 - ylmethylthiocarbamylthio)-5-methyltetrahydrofuran having the formula:

$$\text{(tetrahydropyranyl)}-CH_2-NH-\overset{\overset{S}{\|}}{C}-S-\underset{\underset{O}{\|}}{\overbrace{\phantom{XX}}^{-CH_3}}$$

The procedure of Example 8 was followed, except that 2-aminomethyltetrahydropyran (11.5 g.) was used in the place of ethylamine. The compound was obtained as a viscous yellow oil having a boiling point of 158-168° C. at a pressure of 0.15 mm. of mercury.

Example 21

This example illustrates the preparations of 2-oxo-3 (N-ethoxycarbonylmethylthiocarbamylthio) - 5 - methyltetrahydrofuran having the formula:

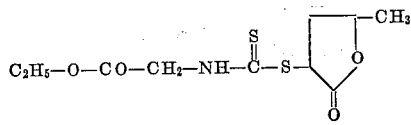

Carbon disulphide (6.3 c.c.) was added carefully to a mixture of ethyl aminoacetate hydrochloride (12.55 g.), triethylamine (20.2 cc.) and water (20 cc.), with shaking and cooling until the reaction was complete 2-oxo-3-bromo-5-methyltetrahydrofuran (17.8 g.) was then added dropwise with shaking and cooling to moderate the vigorous reaction. 2-oxo-3 (N-ethoxycarbonylmethylthiocarbamylthio)-5-methyltetrahydrofuran was obtained initially as a yellow oil which solidified in standing. The solid product on recrystallisation from aqueous ethanol was found to possess a melting point of 79-80° C.

Example 22

This example illustrates the preparation of 2-oxo-3 (N,N-dimethylthiocarbamylthio) - 5 - methyltetrahydrofuran having the formula:

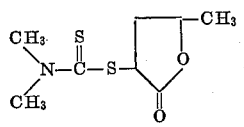

The procedure of Example 6 was followed except that 2-oxo-3-bromo-5-methyltetrahydrofuran (17.8 g.) was used in the place of 2-oxo-3-bromo-tetrahydrofuran. 2-oxo-3 (N,N - dimethylthiocarbamylthio)-5-methyltetrahydrofuran was obtained as a solid which after recrystallisation from ethanol was found to possess melting point of 84° C.

Example 23

This example illustrates the preparation of 2-oxo-3 (N-methylcarbamylthio)-5-methyltetrahydrofuran having the formula:

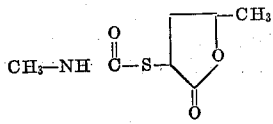

Carbonyl sulphide (11.8 g.) was bubbled into a stirred ice-cooled mixture of a 40% aqueous solution of methylamine (15.2 cc.), triethylamine (20.2 g.) and water (50 mls.) at a rate of 1 to 2 litres per hour. When the addition was completed, the mixture was treated with 2-oxo-3-bromo-5 methyltetrahydrofuran (35.8 g.), dropwise, with vigorous stirring. The mixture was then allowed to stand overnight after which sodium chloride was added. The aqueous solution was then extracted with ether after which the extract was distilled to remove the ether. 2-oxo-3 (N-methylcarbamylthio)-5-methyltetrahydrofuran was obtained as a solid which after recrystallisation from diethyl ether was found to possess a melting point of 88° C.

Example 24

This example illustrates the preparation of 2-oxo-3 (N-ethylcambamylthio)-5 - methyltetrahydrofuran having the formula:

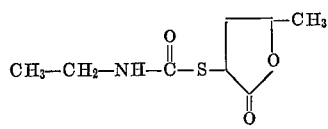

The procedure of Example 23 was followed, except that ethylamine (70% aqueous solution, 13 cc.) was used in the place of the methylamine solution. 2-oxo-3 (N-ethylcarbamylthio)-5-methyltetrahydrofuran was obtained as a yellow oil having a boiling point of 134-138° C. at a pressure of 0.15 mm. of mercury.

Example 25

This example illustrates the preparation of 2-oxo-3 (N-isopropylcarbamylthio) tetrahydrofuran having the formula:

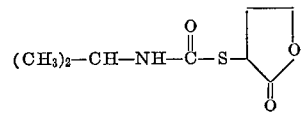

The procedure of Example 23 was followed except that isopropylamine (11.8 g.) was used in the place of the methylamine solution, and 2-oxo-3-bromo-tetrahydrofuran (33 g.) was used in the place of the 2-oxo-3-bromo-5-methyltetrahydrofuran. 2-oxo-3 (N-isopropylcarbamylthio) tetrahydrofuran was obtained as a solid which on recrystallisation from ethanol was found to possess a melting point of 132° C.

Example 26

This example illustrates the preparation of 2-oxo-3 (N-dimethylaminocarbamylthio) - 5 - methyltetrahydrofuran having the formula:

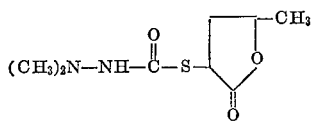

The procedure of Example 23 was followed except that 1,1-dimethylhydrazine (12 g.) was used in the place of the methylamine solution. 2-oxo-3 (N-dimethylaminocarbamylthio)-5-methyltetrahydrofuran was obtained as a white solid, which after recrystallisation from water was found to possess a melting point of 129° C.

Example 27

This example illustrates the preparation of ethylene bis (2-oxo-5-methyltetrahydrofuran-3-yldithiocarbamate) having the formula:

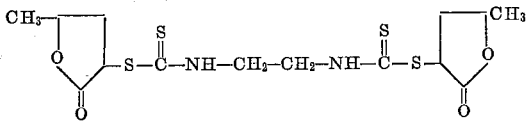

Carbon disulphide (6.3 cc.) was added dropwise to a mixture of ethylene diamine (3 g.), triethylamine (10.1 cc.), ethanol (20 cc.), and water (25 cc.), with stirring and external cooling. After the reaction was completed, 2-oxo-3-bromo-5-methyltetrahydrofuran (17.8 g.) was added dropwise with vigorous stirring. Ethylene bis (2-oxo-5-methyltetrahydrofuran - 3-yldithiocarbamate) was obtained initially as a yellow oil which solidified on standing at 0° C. The product was recrystallised from alcohol and was then found to possess a melting point of 155° C.

Example 28

This example illustrates the preparation of 2-oxo-3 (thiocarbamylthio)-5-methyltetrahydrofuran having the formula:

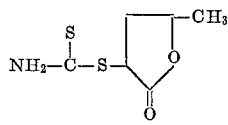

To a solution of ammonia in ethanol (11.4% w./v.; 250 cc.) was added with stirring a solution of carbon disulphide (60 cc.) in ethanol (250 cc.), the temperature being kept at 20° C. during the addition. The mixture was stirred at 20° C. for two hours, followed by a period of standing (16 hours), after which the yellow crystalline precipitate of ammonium dithiocarbamate was filtered off.

To a solution of ammonium dithiocarbamate (12 g.) in water (10 cc.) was added with stirring 2-oxo-3-bromo-5-methyltetrahydrofuran (17.9 g.) dropwise with external cooling to keep the reaction temperature below 25° C. when a yellow oil was separated which solidified on standing. On recrystallisation from chloroform this yielded 2-oxo-3 (thiocarbamylthio)-5-methyltetrahydrofuran as a cream solid having a melting point of 110° C.

Example 29

This example illustrates the preparation of 2-oxo-3 (N-pentamethylene thiocarbamylthio) tetrahydrofuran having the formula:

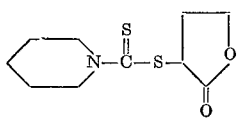

Carbon disulphide (6.3 cc.) was added to a mixture of piperidine (10 cc.) and triethylamine (10.1 cc.) with agitation and ice-cooling. After the initial reaction had subsided 2-oxo-3-bromo-tetrahydrofuran (16.5 g.) was added to the mixture, with further agitation. The precipitated solid was collected by filtration, washed with water, and recrystallised from ethanol to yield 2-oxo-3 (N - pentamethylenethiocarbamylthio) tetrahydrofuran, having a melting point of 108° C.

Example 30

This example illustrates the preparation of 2-oxo-3 (N-pentamethylenethiocarbamylthio) - 5 - methyltetrahydrofuran having the formula:

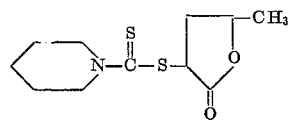

The procedure of Example 29 was followed except that 2-oxo-3-bromo-5-methyltetrahydrofuran (17.9 g.) was used in the place of 2-oxo-3-bromo-tetrahydrofuran 2-oxo-3 (N-pentamethylenethiocarbamylthio)-5-methyltetrahydrofuran is a solid having a melting point of 78° C. after recrystallisation from ethanol.

Example 31

This example illustrates the preparation of 2-oxo-3 (N-3-oxa - pentamethylenethiocarbamylthio) tetrahydrofuran having the formula:

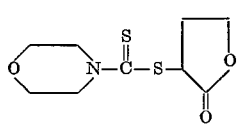

The procedure of Example 29 was used except that morpholine (8.7 cc.) was used in the place of piperidine.

The product 2-oxo-3 (N-3-oxa-pentamethylenethiocarbamylthio) tetrahydrofuran is a solid having a melting point of 71° C. after recrystallisation from ethanol.

Example 32

This example illustrates the preparation of 2-oxo-3 (N - 3-oxa-pentamethylenethiocarbamylthio)-5-methyltetrahydrofuran having the formula:

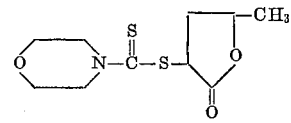

The procedure of Example 30 was followed except that morpholine (8.7 cc.) was used in place of piperidine. The product 2 - oxo-3 (N-3-oxa-pentamethylenethiocarbamylthio)-5-methyltetrahydrofuran is a solid having a melting point of 114° C. after recrystallisation from ethanol.

Example 33

This example illustrates the preparation of 2-oxo-3 (thiocarbamylthio) tetrahydrofuran having the formula:

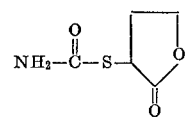

The procedure of Example 28 was followed except that 2-oxo-3-bromo-tetrahydrofuran (16.5 g.) was used in the place of 2-oxo-3-bromo-5-methyltetrahydrofuran. The product, 2-oxo-3 (thiocarbamylthio) tetrahydrofuran, is a solid having a melting point of 85° C. after recrystallisation from a mixture of methanol and petroleum ether (40–60°).

Example 34

This example illustrates the preparation of 2-oxo-3 (N-hexamethylenethiocarbamylthio) - 5 - methyltetrahydrofuran having the formula:

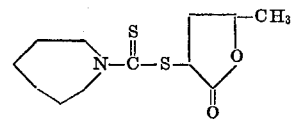

The procedure of Example 30 was followed except that hexamethyleneimine (9.9 g.) was used in place of piperidine. The product 2-oxo-3 (N-hexamethylenethiocarbamylthio)-5-methyltetrahydrofuran is a solid having a melting point of 60° C. after recrystallisation from ethanol.

Example 35

This example illustrates the preparation of 2-oxo-3 (N-pentamethylenecarbamylthio) - 5 - methyltetrahydrofuran having the formula:

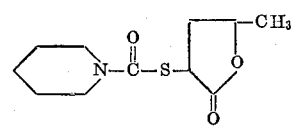

The procedure of Example 23 was followed except that piperidine (18.6 g.) was used in place of the methylamine solution. The product, 2-oxo-3 (N-pentamethylenecarbamylthio)-5-methyltetrahydrofuran, was obtained as an oil having a boiling point of 146–150° C. at a pressure of 0.03 mm. of mercury.

Example 36

This example illustrates the preparation of 2-oxo-3 (N-phenylcarbamylthio)-5-methyltetrahydrofuran having the formula:

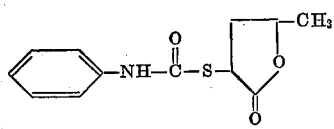

The procedure of Example 26 was followed except that aniline (18.6 g.) was used in the place of 1,1-dimethylhydrazine. The product, 2-oxo-3 (N-phenylcarbamylthio)-5-methyltetrahydrofuran is a solid having a melting point of 125° C. after recrystallisation from a mixture of chloroform and petroleum ether (40–60°).

Example 37

This example illustrates the preparation of 2-oxo-3 (N-4-morpholinylthiocarbamylthio) tetrahydrofuran having the formula:

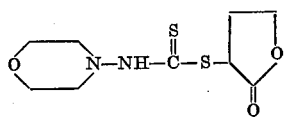

A solution of sodium hydroxide (7 g.) in water (10 cc.) was added dropwise to a stirred mixture of carbon disulphide (5.25 cc.) and N-aminomorpholine hydrochloride (12.1 g.) in water (40 cc.), followed by stirring the mixture at 40° C. for 2 hours. To this mixture is added 2-oxo-3-bromo-tetrahydrofuran (14.1 g.) dropwise with stirring, followed by warming for 1 hour at 40° C. After cooling to 5° C., the precipitate was collected by filtration and recrystallised from ethanol to yield 2-oxo-3 (N-4-morpholinylthiocarbamylthio) tetrahydrofuran, a white solid having a melting point of 173–174° C.

Example 38

This example illustrates the preparation of 2-oxo-3 (N-2-phenethylcarbamylthio) tetrahydrofuran having the formula:

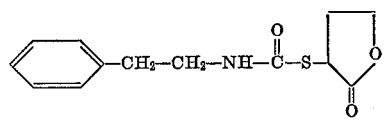

The procedure of Example 23 was followed except that 2-phenethylamine was used in the place of the methylamine solution and 2-oxo-3-bromo-tetrahydrofuran was used in place of the 2-oxo-3-bromo-5-methyltetrahydrofuran. 2-oxo-3 (N-2-phenethylcarbamylthio) tetrahydrofuran is an oil having a boiling point of 174° C. at a pressure of 0.04 mm. of mercury.

The compounds were tested against various fungal diseases and the results of these tests are shown in Tables 1 and 2 below.

In the tests involving foliage diseases the plants were sprayed with a solution or suspension containing 500 parts per million of the active compound and 0.1% of a wetting agent and after 24 hours were inoculated with the disease the extent of which was assessed visually at the end of the test. The results are shown in Table 1 below as a grading giving the percentage amount of disease as follows:

| Grading: | Percentage amount of disease |
|---|---|
| 0 | 61 to 100 |
| 1 | 26 to 60 |
| 2 | 6 to 25 |
| 3 | 0 to 5 |

TABLE 1

| Example No.: | Erysiphe cichoracearum — Powdery mildew — Cucumber | Phytophthora infestans — Late blight — Tomato | Puccinia recondita — Rust — Wheat | Plasmopara viticola — Downy mildew — Vine | Piricularia oryzae — Blast — Rice |
|---|---|---|---|---|---|
|  | Duration of Test in days |  |  |  |  |
|  | 10 | 4 | 10 | 7 | 7 |
| 1 | 2 | 0 | 0 | 2 |  |
| 2 | 0–3 | 1 | 0–2 | 0–2 | 2 |
| 3 | 0 | 0–3 | 0–3 | 0 | 3 |
| 4 | 1 | 0 | 0 | 0 | 2 |
| 5 | 0 | 0–2 | 0–2 |  | 2 |
| 6 |  | 0 | 0–2 |  |  |
| 7 | 1 | 0–3 | 0 |  | 0 |
| 8 | 2 | 3 | 0–2 | 0 | 2 |
| 9 | 0 | 0–2 | 0–2 | 0 | 2 |
| 10 | 0 | 0–2 | 0–1 | 2 | 2 |
| 11 | 0 | 0 | 0 | 1 | 2 |
| 12 | 2 | 0–1 | 0–1 | 0 |  |
| 13 | 0 | 0–1 | 0–2 | 0–1 | 3 |
| 14 | 0 | 2 |  |  |  |
| 15 | 0 | 0–1 |  |  | 3 |
| 16 | 1 | 0 | 0 | 0–1 | 2 |
| 17 | 0 | 0–2 | 0–2 | 1 | 3 |
| 18 | 0 | 0 | 0–1 |  | 3 |
| 19 | 0 | 0–2 |  |  |  |
| 20 | 0 | 0 | 1–3 | 0 |  |
| 21 | 0 | 2–3 | 1 | 3 |  |
| 22 | 2 | 2 |  |  | 2 |
| 23 | 0 | 0–1 | 0–1 | 0 | 2 |
| 24 | 0 | 0 | 0 | 0 | 1 |
| 25 |  | 0 | 0 | 0 |  |
| 26 | 0 | 2–3 | 0 | 0 | 1 |
| 27 |  | 1–2 | 2–3 |  |  |
| 28 |  | 0 | 3 |  |  |
| 29 |  | 1 | 0 |  |  |
| 30 |  | 0–1 | 0 |  |  |
| 31 |  | 0 | 0–1 |  |  |
| 32 |  | 1 | 0 |  |  |
| 33 | 0 | 0–2 | 3 |  |  |
| 35 |  | 2 | 1 |  |  |
| 36 | 0 | 2 | 0 |  |  |
| 37 | 0 | 2–3 | 0 |  |  |
| 38 |  | 1 | 0 |  |  |

In the tests involving seed and soil, for the diseases *Fusarium culmorum* and *Pythium ultimum* the seeds were dressed with a formulation containing 25% of the active ingredient and 75% china clay to give on the seed 1,000 p.p.m. (wheat) and 500 p.p.m. (peas). The seeds were then sown in a partially sterilized soil to which a 2% inoculum of the fungus had been added. The seedlings were examined at the end of the test and the figures given in Table 2 are the number of healthy plants expressed as a percentage. In the test against *Rhizoctonia solani* the active compound was mixed at the rate of 150 parts per million with soil which had been artificially inoculated with a pure culture of the disease. Untreated cotton seed was sown in the soil in pots 3 days later and a count of the healthy seedlings was made at the end of the test. The figures in Table 2 are expressed as a percentage of the seedlings which were healthy. In the test against *Xanthomonas malvacearum* naturally infected cotton seed was dressed at the rate of 1250 parts per million of the active compound and the seed was then sown in sterilized loam in pots. At the end of the test the disease was assessed and the figures given in the table are the number of healthy plants expressed as a percentage.

TABLE 2

| Example No. | *Fusarium culmorum* (Foot-rot) Wheat 20 days | *Pythium ultimum* (Foot-rot) Peas 20 days | *Rhizoctonia solani* (Sore-shin) Cotton 20 days | *Xanthomonas malvacearum* (Black arm) Cotton 10 days |
|---|---|---|---|---|
| 1 | | | | 75 |
| 2 | | 15 | | |
| 3 | | 19 | | |
| 4 | | 16 | | |
| 7 | | 14 | 91 | 84 |
| 8 | | | 16 | |
| 13 | | 16 | | |
| 16 | | 23 | | |
| 18 | | 11 | | |
| 21 | | 21 | | |
| 22 | | | 53 | |
| 23 | | 33 | | |
| 27 | | 20 | | |
| 32 | | 19 | | |
| 34 | | 18 | | |

What we claim is:

1. A lactone carbamyl compound having the formula:

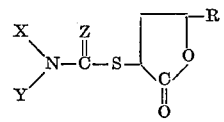

wherein R stands for hydrogen or lower alkyl, Z stands for oxygen or sulfur, X and Y each stand for hydrogen, or alkyl of up to 12 carbon atoms or together with the adjacent nitrogen atom represent a hexamethylenimino, morpholino, or piperidino ring or wherein x stands for a hydrogen atom and Y stands for allyl, chlorophenyl, phenyl-substituted alkyl containing 1 to 2 carbon atoms, phenyl, morpholino, dialkylamino containing up to 3 carbon atoms in each alkyl group, ethoxycarbamylmethyl, tetrahydropyran-2-yl-methyl, or 5-methyl-2-oxo-3-thio-carbamylthio-tetrahydrofuran-ethylene, R being alkyl when Y is alkyl.

2. A lactone carbamyl compound as claimed in claim 1 in which Z stands for sulphur and R and Y each stand for a methyl group to give the compound 2-oxo-3 (N-methylthiocarbamylthio)-5-methyltetrahydrofuran.

3. A lactone carbamyl compound as claimed in claim 1 in which R stands for hydrogen or a methyl group, X stands for hydrogen and Y stands for a dimethyl amino or di-isopropylamino group.

4. A lactone carbamyl compound as claimed in claim 1 in which R stands for hydrogen or a methyl group, Z stands for sulphur, X stands for hydrogen and Y stands for an allyl radical.

5. A lactone carbamyl compound as claimed in claim 1 in which X stands for hydrogen and Y stands for a phenyl, chlorophenyl, benzyl or for phenethyl.

6. A lactone carbamyl compound as claimed in claim 1 in which X and Y together with the adjacent nitrogen atom constitute a morpholino or piperidino group, or in which X stands for hydrogen and Y stands for a morpholino group.

7. A lactone carbamyl compound as claimed in claim 1 in which Z stands for sulphur, R stands for a methyl group, X stands for hydrogen and Y stands for a tetrahydropyran-2-yl methyl group, an ethoxy-carbonyl-methyl group or a 5-methyl substituted 2-oxo-3-thiocarbamylthio-tetrahydrofuran ethylene group.

References Cited

FOREIGN PATENTS 940,536   10/1963   Great Britain.

OTHER REFERENCES

German Pat. No. 801,992, abstracted in Chem. Abs. 45: 5179, June 1951.

HENRY R. JILES, Primary Examiner

C. M. SHURKO, Assistant Examiner

U.S. Cl. X.R.

260—293.4, 343.6; 424—248, 256, 279

PO-1050
(5/69)

UNITED STATES PATENT OFFICE
CERTIFICATE OF CORRECTION

Patent No. 3,464,986            Dated September 2, 1969

Inventor(s) Ranajit Ghosh and Nigel Douglas Bishop

It is certified that error appears in the above-identified patent and that said Letters Patent are hereby corrected as shown below:

Claim 1, line 11 (Column 16, line 7) of the patent "ethoxycarbamylmethyl" should read --ethoxycarbonylmethyl--

In the Abstract, line 11 (Column 1, line 28) of the patent) "Piricularia" should read --Piricutaria--

Signed and sealed this 11th day of January 1972.

(SEAL)
Attest:

EDWARD M. FLETCHER, JR.
Attesting Officer

ROBERT GOTTSCHALK
Acting Commissioner of Patents